US006949283B2

(12) United States Patent
Kollaja et al.

(10) Patent No.: US 6,949,283 B2
(45) Date of Patent: Sep. 27, 2005

(54) POLYMERIC COEXTRUDED MULTILAYER ARTICLES

(75) Inventors: Richard A. Kollaja, Dusseldorf (DE); Axel Eckstein, Korschenbroich (DE); Robert M. Floyd, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 271 days.

(21) Appl. No.: 10/028,638

(22) Filed: Dec. 19, 2001

(65) Prior Publication Data

US 2003/0148095 A1 Aug. 7, 2003

(51) Int. Cl.[7] ............... B32B 3/18; B32B 27/00; B29C 47/06
(52) U.S. Cl. ............ 428/201; 428/354; 428/515; 428/516; 428/517
(58) Field of Search ................ 428/343, 354, 428/355 AC, 515, 516, 517, 201

(56) References Cited

U.S. PATENT DOCUMENTS

| | | |
|---|---|---|
| 2,736,721 A | 2/1956 | Dexter |
| RE24,906 E | 12/1960 | Ulrich |
| 3,365,315 A | 1/1968 | Beck et al. |
| 3,485,912 A | 12/1969 | Schrenk et al. |

(Continued)

FOREIGN PATENT DOCUMENTS

| | | |
|---|---|---|
| DE | 39 40 237 A1 | 6/1991 |
| DE | 198 06 452 A1 | 2/1998 |
| WO | WO 95/16754 | 6/1995 |
| WO | WO 96/25469 | 8/1996 |
| WO | WO 96/34028 | 10/1996 |
| WO | WO 96/35458 | 11/1996 |
| WO | WO 97/23249 | 7/1997 |
| WO | WO 97/23577 | 7/1997 |
| WO | WO 99/28128 | 6/1999 |
| WO | WO 00/06364 | 2/2000 ................... 47/14 |
| WO | WO 00/64657 | 11/2000 |
| WO | WO 00/74916 A1 | 12/2000 |
| WO | WO 01/08866 A1 | 2/2001 |

OTHER PUBLICATIONS

U.S. Appl. No. 09/325,963, "Breathable Polymer Foams".
U.S. Appl. No. 09/778,523 "Conformable Multilayer Films".
U.S. Appl. No. 10/028,052 "Multilayer Coextrusion Die and Method".
Hens, Jules and VanAbbenyer, Willy "Slide Coating" in: Kistler and Schweizer, *Liquid Film Coating* (London, Chapman & Itall, 1997), pp. 427–462.
Durst, Franz and Wagner, hans–Günter "Slot Coating" in Kistler and Schweizer, *Liquid Film Coating* (London, Chapman & Itall, 1997), pp. 401–426.
Web page, Rexam Custom Introduces Multilayer Slide Coating Capability.

Primary Examiner—Daniel Zirker
(74) Attorney, Agent, or Firm—Douglas B. Little (57) ABSTRACT

Described is a polymeric coextruded multilayer web, the web comprising: at least two layers that are discontinuous in the cross-web direction, each layer comprising a plurality of distinct phases that are substantially continuous in the down-web direction; and at least one layer that is substantially continuous in both the cross-web and down-web directions; wherein said web has an x-axis that is in the cross-web direction of the web, a y-axis that is in the down-web direction of the web and a z-axis that is in the thickness direction of the web, and wherein the substantially continuous layer(s) lacks weld lines in the y-z plane of the web.

10 Claims, 1 Drawing Sheet

U.S. PATENT DOCUMENTS

| | | |
|---|---|---|
| 3,759,647 A | 9/1973 | Schrenk et al. |
| 3,982,877 A | 9/1976 | Wyeth et al. |
| 4,091,150 A | 5/1978 | Roelofs |
| 4,152,387 A | 5/1979 | Cloeren ................. 264/173.13 |
| 4,386,125 A | 5/1983 | Shiraki et al. |
| 4,539,256 A | 9/1985 | Shipman |
| 4,592,938 A | 6/1986 | Benoit |
| 4,726,989 A | 2/1988 | Mrozinski |
| 4,767,726 A | 8/1988 | Marshall |
| 4,813,947 A | 3/1989 | Korpman |
| 4,833,179 A | 5/1989 | Young et al. |
| 4,867,881 A | 9/1989 | Kinzer |
| 5,110,530 A | 5/1992 | Havens |
| 5,110,669 A | 5/1992 | Knobel et al. |
| 5,120,594 A | 6/1992 | Mrozinski |
| 5,209,971 A | 5/1993 | Babu et al. |
| 5,217,794 A | 6/1993 | Schrenk |
| 5,236,642 A | 8/1993 | Blemberg et al. |
| 5,269,995 A | 12/1993 | Ramanathan et al. |
| 5,298,310 A | 3/1994 | Havens |
| 5,316,703 A | 5/1994 | Schrenk |
| 5,429,856 A | 7/1995 | Krueger et al. |
| 5,461,134 A | 10/1995 | Leir et al. |
| 5,605,717 A | 2/1997 | Simmons et al. |
| 5,620,780 A | 4/1997 | Krueger et al. |
| 5,705,111 A | 1/1998 | Blemberg et al. |
| 5,726,989 A | 3/1998 | Dokic |
| 5,773,374 A | 6/1998 | Wood et al. |
| 5,800,903 A | 9/1998 | Wood et al. |
| 5,804,610 A | 9/1998 | Hamer et al. |
| 5,840,412 A | 11/1998 | Wood et al. |
| 5,976,424 A | 11/1999 | Weber et al. |
| 6,010,776 A | 1/2000 | Exsted et al. |
| 6,103,152 A | 8/2000 | Gehlsen et al. |
| 6,106,922 A | 8/2000 | Cejka et al. |
| 6,203,742 B1 | 3/2001 | Kegasawa et al. ..... 264/173.16 |
| 6,221,483 B1 | 4/2001 | Hilston et al. |
| 6,579,601 B2 * | 6/2003 | Kollaja et al. .............. 428/212 |

* cited by examiner

Fig. 1

POLYMERIC COEXTRUDED MULTILAYER ARTICLES

FIELD OF THE INVENTION

The present invention is directed to polymeric coextruded multilayer webs, the webs comprising: at least two layers that are discontinuous in the cross-web direction, each layer comprising a plurality of distinct phases that are substantially continuous in the down-web direction; and at least one layer that is substantially continuous in both the cross-web and down-web directions, wherein said web has an x-axis that is in the cross-web direction, a y-axis that is the down-web direction and a z-axis that is in the thickness direction of the web, and wherein the substantially continuous layer(s) lacks weld lines in the y-z plane of the web.

BACKGROUND OF THE INVENTION

The coextrusion of multilayer sheets and other articles is known in the art. Coextrusion of polymeric webs can occur by passing different melt streams from different extruders into a multiple layer feed block and a film die, or into a multiple manifold die. The feedblock technique merges at least two different materials in a feedblock and then feeds them to a die as a layered stack, which becomes a layered sheet as it leaves the die. A multiple manifold die, on the other hand, combines different molten streams from different extruders at a die lip.

Coextrusion of polymers has been particularly used to form polymeric webs with discontinous layers of at least one polymeric material within a matrix of another polymeric material. Examples of some uses for such multilayer articles include tape backings and medical articles. One problem associated with these coextruded articles is that the known apparatuses used to form such articles are designed such that the articles produced have weld lines formed in the y-z plane of the articles.

A weld line in an article is the meeting of two flows of molten polymers when the article is made. The two flow fronts do not bond well and give a weakened inter-flow-front surface bonding. Weld lines can result where two different polymer flows come together. In addition, they can be formed where one polymer flow has been divided and then rejoined. The morphology and the mechanical properties of articles with weld lines differ substantially from those that are devoid of them. In general, the weld lines exhibit an orientation of the material which is parallel to the plane of the weld line, and give rise to considerable embrittlement of the articles.

In particular for multilayer thin film articles, it is desirable that the articles be substantially free of weld lines in the y-z plane. It is inevitable that weld lines will be formed, in coextruded multilayer articles, in the x-y plane, because weld lines will be formed between the different layers in the multilayer webs. However, it is weld lines that are in the y-z plane that are particularly not desired.

Thus a need exists for polymeric coextruded multilayer articles, and a method of making the same, having more than one layer comprising a plurality of distinct phases that are discontinuous in the cross-web direction, and at least one layer that is substantially continuous in both the cross-web and down-web directions, and wherein the substantially continuous layer or layers of the article lack weld lines in the y-z plane.

SUMMARY OF THE INVENTION

The present invention provides polymeric coextruded multilayer webs, and a method of making the same, the webs comprising: at least two layers that are discontinuous in the cross-web direction, each layer comprising a plurality of distinct phases that are substantially continuous in the down-web direction; and at least one layer that is substantially continuous in both the cross-web and down-web directions, wherein said web has an x-axis that is in the cross-web direction, a y-axis that is in the down-web direction and a z-axis that is in the thickness direction of the web, and wherein the substantially continuous layer(s) lacks weld lines in the y-z plane of the web.

An advantage of at least one embodiment of the present invention is that the layers are co-extruded in a controlled manner. The layers are formed and brought together in the melt state, thereby allowing for improved adhesion to one another. In addition, even when the materials used for the different layers are not normally compatible (in that they do not adhere to one another well), the process allows them to be co-extruded to produce a web with the properties of each of the materials.

Another advantage of at least one embodiment of the present invention is that the method is capable of making coextruded articles containing a large number of small distinct phases in the discontinuous layers. This is advantageous, for example, over a small number of large distinct phases because of problems with performance (e.g. vapor transmission properties) of films having large distinct phases. The small distinct phases of the present invention are less obtrusive individually although they may sum to the same volume fraction as a small number of large distinct phases.

Yet another advantage of at least one embodiment of the present invention is that there is cross-web uniformity in the discontinuous and continuous layers.

In the present invention,

"Down-web" refers to the lengthwise direction of the web, or the direction of the web that extends in the machine direction (or longitudinal direction); and "Cross-web" refers to a direction about perpendicular to the down-web direction.

DETAILED DESCRIPTION OF THE INVENTION

Article

Figure 1:
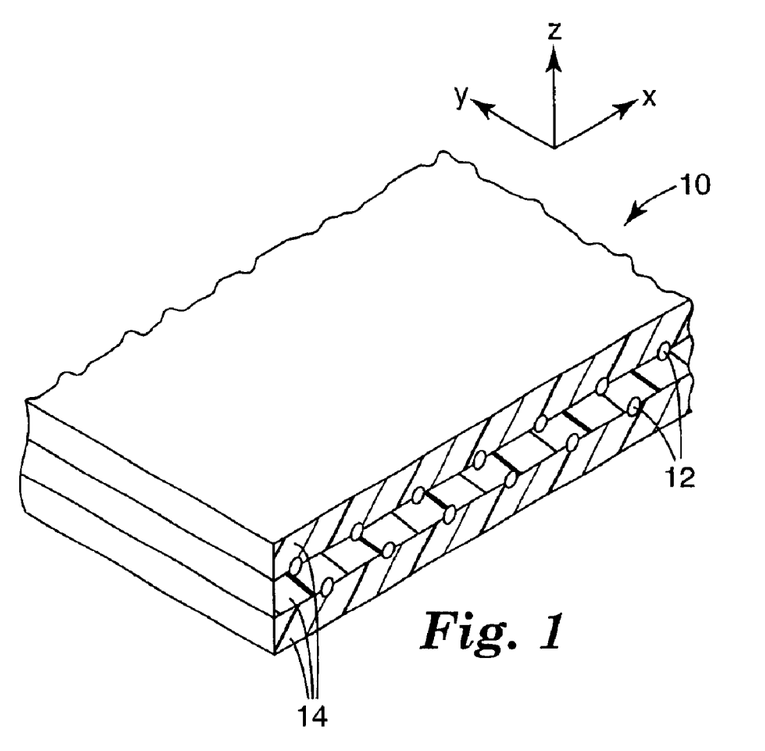
FIG. 1 is a perspective view of a multilayer polymeric web made in accordance with an embodiment of the invention and showing the web in cross-section.

FIG. 1 shows a cross-sectional view of one exemplary construction of the inventive article 10. The article 10 shows two discontinuous layers of distinct phases 12 alternated with three continuous layers 14. The figure also shows the x-axis, y-axis and z-axis of the inventive webs or articles. The x-axis is in the cross-web direction of the web, the y-axis is in the down-web direction of the web and the z-axis is in the thickness direction of the web.

Preferably, the multilayer webs of the present invention have a construction of at least 3 layers (including both continuous and discontinuous layers), more preferably at least 5 layers, even more preferably, at least 9 layers. The minimum number of discontinuous layers in the present inventive article is two. The minimum number of continuous layers in the present inventive article is one. The practical upper limit for the number of layers in the present inventive article is up to about 50.

The inventive article may include a continuous layer or layers that alternate with the discontinuous layers, as shown in FIG. 1. The two outermost layers may both be continuous layers, or both discontinuous layers, or one of each.

Preferably, each continuous layer is substantially uniform in thickness. The multiple layers are "unified" as a single multilayer film such that the layers do not readily separate.

The inventive article may not, however, always alternate continuous layers with discontinuous layers. Another alternative would be to include two adjacent, continuous layers between discontinuous layers. For example a tie layer may be used between the continuous layers and discontinuous layers in order to attach them or adhere them to one another. The tie layer material may contain compatibilizers. Some examples of compatibilizers can be found in WO 99/28128. Other combinations are also contemplated by the present invention.

In any one article, each individual discontinuous layer typically includes the same material or combination of materials, although each individual discontinuous layer may be made of the different materials from the other discontinuous layers. Similarly, each of the continuous layers typically includes the same material or combination of materials, although each individual continuous layer may include different materials or combinations of materials from the other continuous layers.

Discontinuous Layer(s)

Suitable materials for use in forming the discontinuous layer(s) of the present invention are any materials that can be thermally processed, that is they are fluid or pumpable at the temperatures used to melt process the webs (e.g., about 50° C. to about 300° C.), and they are film formers. Furthermore, suitable materials do not significantly degrade or gel at the temperatures employed during melt processing (e.g., extruding or compounding). Preferably, such materials have a melt viscosity of about 10 poise to about 1,000,000 poise, as measured by capillary melt rheometry at the processing temperatures and shear rates employed in extrusion. Typically, suitable materials possess a melt viscosity within this range at a temperature of about 175° C. and a shear rate of about 100 seconds.

Suitable materials include, but are not limited to, pressure sensitive adhesives, nonpressure-sensitive adhesives, thermoplastic materials, elastomeric materials, melt-processable foams, high viscosity liquids, and mixtures thereof.

"Pressure-sensitive adhesive" ("PSA") means an adhesive that displays permanent and aggressive tackiness to a wide variety of substrates after applying only light pressure. It has a four-fold balance of adhesion, cohesion, stretchiness, and elasticity, and is normally tacky at use temperatures, which is typically room temperature (i.e., about 20° C. to about 30° C.). A pressure-sensitive adhesive also typically has an open time tack (i.e., period of time during which the adhesive is tacky at room temperature) on the order of days and often months or years. An accepted quantitative description of a pressure-sensitive adhesive is given by the Dahlquist criterion line (as described in Handbook of Pressure-Sensitive Adhesive Technology, Second Edition, D. Satas, ed., Van Nostrand Reinhold, New York, N.Y., 1989, pages 171–176), which indicates that materials having a storage modulus (G') of less than about $3 \times 10^5$ Pascals (measured at 10 radians/second at a temperature of about 20° C. to about 22° C.) have pressure-sensitive adhesive properties while materials having a G' in excess of this value do not.

"Nonpressure-sensitive adhesive" means nontacky polymeric materials, which are polymeric materials that are tacky when in the melt state but that do not display pressure sensitive properties, or other materials that have adhesive properties at room temperature but do not meet the Dahlquist criterion as described above. Such materials have a storage modulus (G') of at least about $3 \times 10^5$ Pascals (measured at 10 radians/second at a room temperature of about 20° C. to about 22° C.). These materials can be nontacky thermoplastic materials, which can be elastomeric or nonelastomeric. Alternatively, they can be nontacky elastomers.

Generally, although not necessarily, particularly useful pressure-sensitive adhesives are amorphous with a glass transition temperature (Tg) of less than about 20° C.

The pressure-sensitive adhesive material can include a single pressure-sensitive adhesive, a mixture (e.g., blend) of several pressure-sensitive adhesives, or a mixture (e.g., blend) of a pressure-sensitive adhesive and a material that is a nonpressure-sensitive adhesive (e.g., a nontacky thermoplastic material, which may or may not be elastomeric), as long as the layer has pressure-sensitive adhesive properties. Examples of some pressure-sensitive adhesive blends are described in PCT Int'l Applications having numbers WO 97/23577, WO 97/23249, and WO 96/25469. Similarly, a suitable nonpressure-sensitive adhesive material layer can include a single material that is a nonpressure-sensitive adhesive, a mixture of several such materials, or a mixture of a material that is not a pressure-sensitive adhesive with a pressure-sensitive adhesive, as long as the layer does not have pressure-sensitive adhesive properties.

Pressure-sensitive adhesives useful in the discontinuous layer(s) can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and self-tacky or tackified silicones. Examples of suitable pressure-sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), and U.S. Pat. No. 5,461,134 (Leir et al.), for example (which are all incorporated herein by reference). Others are described in the Encyclopedia of Polymer Science and Engineering, vol. 13, John Wiley & Sons, Inc., New York, 1988, and the Encyclopedia of Polymer Science and Technology, vol. 1, John Wiley & Sons, Inc., New York, 1964 (which is incorporated herein by reference).

Useful natural rubber pressure-sensitive adhesives generally contain masticated natural rubber, one or more tackifying resins, and one or more antioxidants. Useful synthetic rubber adhesives are generally rubbery elastomers, which are either inherently tacky, or nontacky and require tackifiers. Inherently tacky (i.e., self-tacky) synthetic rubber pressure-sensitive adhesives include for example, butyl rubber, a copolymer of isobutylene with less than 3 percent isoprene, polyisobutylene, a homopolymer of isoprene, polybutadiene, or styrenelbutadiene rubber.

Styrene block copolymer pressure-sensitive adhesives generally comprise elastomers of the A-B or A-B-A type, wherein, in this context, A represents a thermoplastic polystyrene block and B represents a rubbery block of polyisoprene, polybutadiene, or poly(ethylene/butylene), and tackifying resins. Examples of the various block copolymers useful in block copolymer pressure-sensitive adhesives include linear, radial, star, and tapered block copolymers. Specific examples include copolymers such as those available under the trade designations KRATON™ from Shell Chemical Co., Houston, Tex., and EUROPRENE SOL™ from EniChem Elastomers Americas, Inc., Houston, Tex.

Examples of tackifying resins for use with such styrene block copolymers include aliphatic olefin-derived resins, rosin esters, hydrogenated hydrocarbons, polyterpenes, terpene phenolic resins derived from petroleum or terpentine sources, polyaromatics, cournarone-indene resins, and other resins derived from coal tar or petroleum and having softening points above about 85° C.

(Meth)acrylate (i.e., acrylate and methacrylate or "acrylic") pressure-sensitive adhesives generally have a glass transition temperature of about −20° C. or less and typically include an alkyl ester component such as, for example, isooctyl acrylate, 2-ethyl-hexyl acrylate, and n-butyl acrylate, and a polar component such as, for example, acrylic acid, methacrylic acid, ethylene vinyl acetate, and N-vinyl pyrrolidone. Preferably, acrylic pressure-sensitive adhesives comprise about 80 wt % to about 100 wt % isooctyl acrylate and up to about 20 wt % acrylic acid. The acrylic pressure-sensitive adhesives may be inherently tacky or tackified using a tackifier such as a rosin ester, an aliphatic resin, or a terpene resin.

Poly-α-olefin pressure-sensitive adhesives, also called poly(1-alkene) pressure-sensitive adhesives, generally comprise either a substantially uncrosslinked polymer or an uncrosslinked polymer that may have radiation activatable functional groups grafted thereon as described in U.S. Pat. No. 5,209,971 (Babu et al.) (which is incorporated herein by reference). Useful poly-α-olefin polymers include, for example, $C_3$–$C_{18}$ poly(1-alkene) polymers. The poly-α-olefin polymer may be inherently tacky and/or include one or more tackifying materials such as resins derived by polymerization of $C_5$–$C_9$ unsaturated hydrocarbon monomers, polyterpenes, synthetic polyterpenes, and the like.

Silicone pressure-sensitive adhesives comprise two major components, a polymer or gum and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Silicone pressure-sensitive adhesives are described in U.S. Pat. No. 2,736,721 (Dexter) (which is incorporated herein by reference). Silicone urea block copolymer pressure-sensitive adhesives are described in U.S. Pat. No. 5,461,134 (Leir et al.), and PCT Int'l Application Nos. WO 96/34028 and WO 96/35458 (which are incorporated herein by reference).

Nonpressure-sensitive adhesive polymeric materials that may be used in the discontinuous layer(s) of the present invention may include one or more thermoplastic materials, which may or may not be elastomeric materials, and elastomers. These may be adhesive (i.e., tacky) when in the melt state or nonadhesive (i.e., nontacky) materials, as long as the adhesive materials are not pressure sensitive, as defined above.

Thermoplastic materials are generally materials that flow when heated sufficiently above their glass transition temperature and become solid when cooled. They may be elastomeric or nonelastomeric. Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof, ethylene-vinyl acetate copolymers such as those available under the trade designation ELVAX™ from E. I. DuPont de Nemours, Inc., Wilmington, Del.; ethylene acrylic acid copolymers; ethylene methacrylic acid copolymers such as those available under the trade designation SURLYN™ 1702 from E. I. DuPont de Nemours, Inc.; polymethylmethacrylate; polystyrene; ethylene vinyl alcohol; polyesters including amorphous polyester; polyamides; fluorinated thermoplastics such as polyvinylidene fluoride and fluorinated ethylene/propylene copolymers; halogenated thermoplastics such as chlorinated polyethylene; polyether-block-amides such as those available under the trade designation PEBAX™ 5533 from Elf-Atochem North America, Inc., Philadelphia, Pa.

Thermoplastic materials that have elastomeric properties are typically called thermoplastic elastomeric materials. Thermoplastic elastomeric materials are generally defined as materials that exhibit high resilience and low creep as though they were covalently crosslinked at ambient temperatures, yet process like thermoplastic nonelastomers and flow when heated above their softening point. Thermoplastic elastomeric materials useful in the discontinous layer(s) of the present invention include, for example, linear, radial, star, and tapered block copolymers such as those listed above with respect to pressure-sensitive adhesives (e.g., styrene-isoprene block copolymers, styrene-(ethylene-butylene) block copolymers, styrene-(ethylene-propylene) block copolymers, and styrene-butadiene block copolymers); polyetheresters such as that available under the trade designation HYTREL™ G3548 from E. I. DuPont de Nemours, Inc.; polyether block amides such as PEBAX™ available from Elf Atochem, Philadelphia, Pa.; ethylene copolymers such as ethylene vinyl acetates, ethylene/propylene copolymer elastomers or ethylene/propylene/diene terpolymer elastomers and metallocene polyolefins such as polyethylene, poly (1-hexene), copolymers of ethylene and 1-hexene, and poly(1-octene); thermoplastic elastomeric polyurethanes such as that available under the trade designation MORTHANE™ PE44-203 polyurethane from Morton International, Inc., Chicago, Ill. and the trade designation ESTANE™ 58237 polyurethane from B. F. Goodrich Company, Cleveland, Ohio; polyvinylethers; poly-α-olefin-based thermoplastic elastomeric materials such as those represented by the formula —$(CH_2CHR)_x$ where R is an alkyl group containing 2 to 10 carbon atoms, and poly-α-olefins based on metallocene catalysis such as ENGAGE™ 8200, ethylene/poly-α-olefin copolymer available from Dow Plastics Co., Midland, Mich.

Elastomers, as used herein, are distinct from thermoplastic elastomeric materials in that the elastomers require crosslinking via chemical reaction or irradiation to provide a crosslinked network, which imparts modulus, tensile strength, and elastic recovery. Elastomers useful in the present invention include, for example, natural rubbers such as CV-60, a controlled viscosity grade of rubber, and SMR-5, a ribbed smoked sheet rubber; butyl rubbers, such as EXXON™ Butyl 268 available from Exxon Chemical Co., Houston, Tex.; synthetic polyisoprenes such as CARIFLEX™, available from Shell Oil Co., Houston, Tex., and NATSYN™ 2210, available from Goodyear Tire and Rubber Co., Akron, Ohio; ethylene-propylenes; polybutadienes; polybutylenes; polyisobutylenes such as VISTANEX MM L-80, available from Exxon Chemical Co.; and styrene-butadiene random copolymer rubbers such as AMERIPOL SYNPOL™ 1011 A, available from American Synpol Co., Port Neches, Tex.

Melt-processable foams that may be used for the discontinuous layers of the present invention are generally described in WO 00/64657 and WO 00/74916.

One type of foam is a melt-processable polymer foam. Melt-processable polymer foams are those materials made by combining certain of the above polymeric materials with a blowing agent (chemical or physical). The resulting mixtures are then subjected to various changes known in the art to activate the blowing agent thereby forming a multiplicity of cells within the polymer. Additional crosslinking may occur to cause resulting foams to be more stable.

A particularly useful foam, when an elastic foam matrix is desired, is that disclosed in Co-pending U.S. patent application having Ser. No. 09/325,963, and incorporated herein by reference.

High viscosity liquids are also suitable as materials for the discontinuous layer(s). They are any liquids that do not diffuse through the continuous layer material and prematurely escape the article of the invention. These include, for example, various silicone oils, mineral oils and specialty materials having a sharp melting temperatures around or below room temperature.

Other additives include, for example, viscosity reducing polymers and plasticizers can also be blended with the elastomers. These viscosity reducing polymers include thermoplastic synthetic resins such as polystyrene, low molecular weight polyethylene and polypropylene polymers and copolymers, or tackifying resins such as WINGTACK™ resin from Goodyear Tire & Rubber Company, Akron, Ohio. Examples of tackifiers include aliphatic or aromatic liquid tackifiers, aliphatic hydrocarbon resins, polyterpene resin tackifiers, and hydrogenated tackifying resins. Additives such as dyes, pigments, antioxidants, antistatic agents, bonding aids, antiblocking agents, slip agents, heat stabilizers, photostabilizers, foaming agents, glass bubbles, starch and metal salts for degradability or microfibers can also be used in the elastomeric phase. Suitable antistatic aids include ethoxylated amines or quaternary amines such as those described, for example, in U.S. Pat. No. 4,386,125 (Shiraki) (which is incorporated herein by reference), which also describes suitable antiblocking agents, slip agents and lubricants. Softening agents, tackifiers or lubricants are described, for example, in U.S. Pat. No. 4,813,947 (Korpman) (which is incorporated herein by reference) and include coumarone-indene resins, terpene resins, hydrocarbon resins and the like. These agents can also function as viscosity reducing aids. Conventional heat stabilizers include organic phosphates, trihydroxy butyrophenone or zinc salts of alkyl dithiocarbonate.

Various additives may be incorporated into the discontinuous layer(s) to modify the properties of the finished web. For example, additives may be incorporated to improve the adhesion of the distinct phases of the discontinuous layer(s) and the continuous layer(s) to one another. The co-extruded web may also be laminated to a fibrous web. Preferably, the fibrous web is a nonwoven web such as a consolidated or bonded carded web, a meltblown web, a spunbond web, or the like. The fibrous web may be bonded or laminated to the coextruded web by adhesives, thermal bonding, extrusion, ultrasonic welding or the like.

Short fibers or microfibers can be used to reinforce the distinct phases of the discontinuous layer(s) for certain applications. These fibers include polymeric fibers, mineral wool, glass fibers, carbon fibers, silicate fibers and the like. Further, certain particles can be used, including carbon and pigments. Glass bubbles or foaming agents may be used to lower the density of the fibers and can be used to reduce cost by decreasing the content of an expensive material or the overall weight of a specific article. Suitable glass bubbles are described in U.S. Pat. No. 4,767,726 (Marshall) and U.S. Pat. No. 3,365,315 (Beck et al.) (which are incorporated herein by reference).

Blowing agents used to generate foams in melt processable materials are known in the art and include azodicarbonamides such as SAFOAM RIC-50™ sodium bicarbonate-based chemical blowing agent. Fillers can also be used to some extent to reduce costs. Fillers, which can also function as antiblocking agents, include titanium dioxide and calcium carbonate.

The distinct phases of the discontinuous layer(s) may have different cross-sectional shapes. For example, the cross-sectional shape of the distinct phases may be circular, oval or slit shaped. The shape of the cross-section of the distinct phases may be dependent upon the viscosity of the material that is used to form the distinct phases. For example, by using a more viscous material the distinct phases may retain a nearly circular cross-sectional shape, while using a less viscous material may result in more of an oval shape. Also, the shape of the cross-section of the distinct phases may be affected by the multilayer film being "drawn-down." "Draw-down" occurs when the polymer melt (molten material) comes out of a die and is pulled away by the chill roll (also called a roll stack, which is a water cooled roll that is used to form and quench the molten web into a room temperature web) to form a thinner material. The film is "drawn-down" into the final thickness. It is a shape-forming step. Also, the shape of the cross-section of the distinct phases may be affected by the shape of the orifices in the apparatus used to make the article. For example, the orifices may be circular, oval or slit shaped.

The number of orifices or number of distinct phases of a discontinuous layer of the present invention can range from about 2 orifices or distinct phases per discontinuous layer to about 20 orifices or distinct phases per every 2.54 centimeters of width of said discontinuous layers.

There are practical limitations on the number of orifices in the die that forms each discontinuous layer. One limitation is in the machining of the die. There needs to be supporting steel, or other material, between the holes or orifices in the die for the inventive article to be formed using the die. Another limitation in the number of orifices is that if there are too many holes, the layer will end up being substantially continuous rather than discontinuous. The distinct phases of the layer could actually merge together instead of staying separate.

Continuous Layer(s)

Suitable materials for the continuous layer(s) of the present invention include the same materials provided above for the discontinuous layers. Therefore, there are many possible combinations of materials that may form the present inventive web or article. It is preferable, however, to form adjacent layers using materials having similar polymer melt viscosities. It is most preferred that the discontinuous layers comprise a material that has a slightly higher polymer melt viscosity than the polymer melt viscosity of the continuous layer(s). It is most preferred that the materials that comprise the different layers (discontinuous and continuous layers) have polymer melt viscosities that are within a factor of two of one another.

The continuous layer or layers are preferably substantially uniform in thickness.

The continuous layers of the inventive web are substantially free from weld lines in the y-z plane (the axes shown in FIG. 1 define the y-z plane).

Exemplary Applications

The present inventive article is suitable for use in a number of applications.

One application of the present invention is a fiber (or distinct phase)-reinforced PSA. See Examples 1–4. The discontinuous layers of distinct phases, which comprise fibers, provide an increase in the shear properties of the PSA used without significant crosslinking of the PSA. Some particularly preferred materials for the continuous layers include acrylics, block copolymers, natural and synthetic rubbers and polyαolefin PSAs. Other particularly useful PSAs for use in the continuous layers are those made by the pouch polymerization method of U.S. Pat. No. 5,804,610, which is incorporated herein by reference. Some preferred materials for the discontinuous layers include higher modulus PSAs, thermoplastics (such as polyolefins, polyamides, polyesters, styrenic polymers), homopolymers and copolymers thereof. A particularly useful copolymer of polyolefin is ethylene vinyl acetate (EVA).

A second exemplary application is a fiber (or distinct phases)-reinforced low surface energy PSA. See Examples 5–7. Low surface energy PSAs are those designed to adhere to low surface energy materials, such as new critical paint surfaces. The distinct phases of the discontinuous layers of the present invention provide the lower surface energy PSAs with an increase in shear properties (at room and high temperatures) and an increase in peel strength.

Another application of this invention is a fiber (or distinct phases)-reinforced pressure-sensitive adhesive (PSA) foam. See Examples 8–10. The foam material contains embedded distinct phases of a polymer that provide the article with better tensile strength than if it were made of the foam material only. Expandable microspheres, chemical blowing agents and/or physical (gas) blowing agents may be used to foam the continuous layers of polymer(s). Examples of materials that may be used for the continuous layers can be found in U.S. Pat. No. 6,103,152 (Gehlsen et al.) (which is incorporated herein by reference). Some particularly preferred PSAs include acrylics, block copolymers, natural and synthetic rubbers, and polyalphaolefin PSAs. The discontinuous layers may be made of higher modulus PSAs, thermoplastics, homopolymers and copolymers thereof. An example of a preferred embodiment is an article comprising an acrylic PSA (made according to U.S. Pat. No. 5,804,610) for the continuous layers and ethylene vinyl acetate (EVA) for the distinct phases that make up the discontinuous layers, and made using the foaming method of expandable microspheres.

One application is a conformable film. See Examples 11–12. Conformable film may be used, for example, as paint mask film to mask sections of automobiles when the automobiles are painted. Another example of a use for a conformable film is as a graphics film to be applied to substrates, such as an automobile or truck. For both exemplary uses, the conformable film is desired to have good stress relaxation and low strain recovery to enable the film to be applied over irregular surfaces on substrates without delaminating or releasing from the substrate surface.

In conformable films, the discontinuous layers, which may comprise thermoplastic homo- or copolymers, or mixtures and blends thereof, can be placed between continuous layers that may also comprise thermoplastic homo- and copolymers (and mixtures and blends thereof) to form the conformable film. Some particularly preferred materials for the continuous layers include polyolefins blended together or with soft elastomers such as elastomeric block copolymers, natural and synthetic rubbers, etc. Some examples of discontinuous layer materials include higher modulus thermoplastics such as polyamides, styrenic polymers, cyclic polyolefins, homopolymers and copolymers thereof. One particularly preferred combination is a blend of isotactic polypropylene and a soft elastomeric polypropylene for the continuous layers and a norbornene-ethylene cyclic polyolefin copolymer for the discontinuous layers. The material making up the discontinuous layers preferably has a high glass transition temperature ($T_g$) or is semicrystalline (has a $T_m$).

The conformable films of the present invention preferably exhibit a desirable combination of conformability, high stress relaxation and low strain recovery. In addition, these conformable films have reduced shrinkage under high temperatures. The distinct phases provide more dimensional stability to the conformable films.

Some examples of the materials that may be used in conformable films are described generally in US 01-0008687-A1 (which is incorporated herein by reference).

Reinforced porous film is yet another exemplary embodiment of the present inventive article. See Example 14. In these films, a strong distinct phases material, or discontinuous layer material, may be incorporated into a weaker continuous layer material to strengthen the resulting film in the down-web direction. Examples of materials that may be used to make the continuous layers are disclosed in U.S. Pat. No. 4,539,256 (Shipman), U.S. Pat. No. 4,867,881 (Kinzer), U.S. Pat. No. 4,726,989 (Mrozinski), U.S. Pat. No. 5,726,989 and U.S. Pat. No. 5,120,594 (Mrozinski). Suitable materials for the discontinuous layers, which serve to strengthen the resulting article in the down-web direction, are any that are stronger than the material used to form the continuous layers.

Alternatively, the distinct phases of the discontinuous layers in the decorative film may be used for decorative purposes. See Example 13. For example, the distinct phases may comprise a die or colorant. Further they may comprise a porous material that absorbs oil, for example. The reinforced porous film may be used as a facial oil remover cloth. The distinct phases may turn a darker color when exposed to/it contacts oil on a person's skin, for example. Examples of materials that may be used for the discontinuous layers include, but are not limited to, polyethylene, polypropylene, nylon and polyester. Suitable materials for the continuous layers include, but are not limited to, polypropylene/mineral oil blends, and polyethylene/mineral oil blends.

More generally, the present invention may provide a thermoplastic material that includes reinforcing or strengthening distinct phases. An example of a resultant article is a garbage bag, which is subjected to high tensile stresses as a result of bag contents. The distinct phases provide strength in the down-web direction usually.

Method of Making

An apparatus used to make the inventive articles is described in Assignee's Co-pending and concurrently filed, U.S. Patent Application having Publication Number US 2003/0111762 A1, publication date Jun. 19, 2003 (which is incorporated by reference herein in its entirety).

The film is expelled as an integral, multilayer film structure. Coextruded films prepared in this manner look much like monolayer films. A number of additional steps can optionally be performed after extrusion (using the apparatus described above). For example, the web can be uniaxially or biaxially oriented, either sequentially or simultaneously, can be cured (such as by heat, electromagnetic radiation, etc.), or can be dusted with various tack-reducing agents.

The film may further be endowed with improved physical properties by biaxial orientation and heat-setting. Biaxial orientation involves stretching the film in two directions perpendicular to each other, generally in the down-web direction and cross-web direction. In a typical operation, the freshly extruded molten film is fed into a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first.

Heat-setting, or heat stabilization of the stretched coextruded film is accomplished by restraining the film in its stretched dimension and heating briefly, then quenching.

EXAMPLES

This invention is further illustrated by the following examples, which are not intended to limit the scope of the invention. In the examples, all parts, ratios and percentages are by weight unless otherwise indicated.

The following test methods were used to characterize various embodiments of the invention including the pressure sensitive adhesives, foams, conformable films, and porous films in the Examples:

Test Methods

180° Peel Adhesion Test

A sample of a coextruded pressure-sensitive adhesive (PSA) sample between two liners was cut into a strip measuring 12.7 centimeters (cm) by 2.54 cm. A liner from one side was removed to expose a surface of the PSA, which was then laminated to the aluminum side of an aluminum-coated polyester film (thickness of 25 micrometers ($\mu$m), ID-Nr. 7KF002R0250.023.001) from Tricon Veredelungs GmbH, Freiburg, Germany. The liner on the other surface of the PSA was then removed and the surface was adhered to a 12 cm by 5 cm test surface panel that had been previously cleaned. The test surface panels were either (a) stainless steel (SS), (b) low surface energy powder clear-coat (PCC) or (c) cast polypropylene (PP), and are described in Table A.

TABLE A

| Test Surface | Source |
| --- | --- |
| SS | Schumacher Stahlbau, Duesseldorf, Germany |
| PCC | Enviracryl PCC 10106 from PPG Industries Lacke GmbH, Wuppertal, Germany |
| PP | PP Panels natural from Precision Punch & Plastics, Minneapolis, USA |

Both the SS test surface and the PP test surface had been cleaned by a) wiping with a tissue saturated with methyl ethyl ketone (MEK), b) wiping with a tissue saturated in diacetone alcohol, and c) wiping with a tissue saturated with a 1:1 by volume mixture of water and isopropanol. The PCC test surface had been cleaned by wiping once with a tissue soaked with isopropanol and twice with a 50:50 mixture of iso-propanol/water. The sample film was rolled down onto the test surface panel with two passes of a 2.05 kilogram (kg) hard rubber roller. The test surface panel (with sample attached) was then conditioned at room temperature (about 21° C.) for about 24 hours. The conditioned sample/panel combination was then mounted on a peel tester and the sample film was pulled off the test panel at a 180° angle at a speed of 30 cm per minute (min.). The results are reported in the tables in Newtons per decimeter (N/dm). The values are an average of three tests. The failure mode was adhesive unless noted otherwise.

Room Temperature and High Temperature Shear Strength Test

Static shear was determined by removing a liner from one surface of a PSA composite sample and laminating the exposed surface to a 0.025 millimeters (mm) thick piece of aluminum-coated polyester film (thickness of 25 µm, ID-Nr. 7KF002R0250.023.001) and cutting to a dimension of 12.7 cm by 1.27 cm. One end of the sample was adhered with a 2.54 cm overlap to a pre-cleaned panel consisting of either a SS panel or a PCC panel. Resulting overlap was 1.27 cm×2.54 cm.

Room Temperature: After a sample was conditioned at 23° C. for twenty minutes at 50% Room Humidity (RH), a weight of 250 grams (g) was attached to the unadhered end of the sample. The panel was then hung at about 2° tilt from the vertical to assure a shear mode failure. The time in which the sample pulled away from the panel was measured in minutes. The test was discontinued after 10,000 mins. The reported values represent the average of three tests.

High Temperature: A sample was conditioned for 20 minutes at 70° C. in a forced air oven and hung at about a 2° tilt in that oven with an attached weight. Also, the resulting overlap was 2.54 cm by 2.54 cm. In addition, the suspending weight was either (1) 1000 grams (g) and the test was stopped after 10,000 minutes (min.) or (2) 2000 g and the test was stopped after 20,000 min.

Density

Density of foam was measured by using a gas displacement device for the measurement of the volume of solid objects of irregular or regular shape (AccuPyc 1330 Gas Pyknometer, available from Micromeritics, Moenchengladbach, Germany). The device was calibrated in order to measure the real cell chamber volume. A sample, approximately 40 mm wide and 140 mm long, was weighed, rolled and placed into the cell chamber. The cell chamber was purged ten times with nitrogen in order to replace any gas molecules other than nitrogen. The sample was measured ten times and the software automatically calculated the density of the sample for each test cycle. All tests were performed at a constant temperature of 21.8° C.

Tensile Test

The tensile test was used to obtain stress-strain data for conformable film samples. Film samples having a width of 1.27 cm (0.5 in.) were made with a special cutter comprised of paired, acurately gapped razor baldes. The samples were tested at 25° C. using an INSTRON™ Tensile Tester (Model 1122), commerically available from Instron Corporation (Canton, Mass.). The thickness of each sample was measured and inputed to the INSTRON™ Tensile Tester so that tensile results could be displayed based on sample cross-sectional area. All samples were tested with an initial distance between the grips of the tester of 5.1 cm (2 inches) and at a rate of grip separation of 30.5 cm/min (12 in/min). Samples were tested along the down-web direction (DD). Values were reported for the elastic modulus, maximum stress achieved and elongation at break.

Stress Relaxation Test

In order to determine the tendency of a film to relax or lose stress with time, a stress relaxation test was performed. The test was conducted on an INSTRON™ Tensile Tester (Model 1122), using an initial distance of 5.1 cm (2 inches) between the two grips, and a constant rate of grip separation of 1.27 meters (m)/min. (50 inches (in.)/min.). One of each grip was attached to each end of the film. The film was strained until an elongation of 57% of original length (as described below) was obtained. After the 57% elongation point was reached the INSTRON™ grips were stopped giving a strain rate of zero, and the stress was monitored for three minutes.

The predetermined elongation of 57% was used because 57% corresponds to the calculated elongation needed for a flat polymer film to conform to a half-circle protrusion. A half circle protrusion represents an extreme case of conformability. The percent residual stress is defined as 100 times the stress at 3 minutes divided by the maximum stress at 57% elongation.

Necking Test

The amount of necking for each sample was determined by examination of the stress strain curve for the sample. The curve was generated with a standard tensile/elongation method on an INSTRON™ mechanical testing frame operating at 30.5 cm/min. (12 in./min.). Samples were of 1.27 cm (0.5 in.) width and gauge length of 5.1 cm (2 inches). Thickness of the samples depended on process conditions and were measured using an Ono Sokki Liner Thickness Gage available from Ono Sokki, Painesville, Ohio. The necking percent was determined by noting the stress value (S1) at the point of initial maximum stress and the stress value (S2) at the following minimum stress. Necking is defined as 100×(S1−S2)/S1 and is reported as percent necking.

Shrinkage

Unrestrained linear thermal shrinkage of plastic film was measured according to ASTM D 1204. A film sample having a width of about 25.4 mm and a length of about 101.6 mm was cut with a die. The length direction was parallel to the direction in which the film was made, i.e. the down-web direction (DD). Notches, for reference points, were made about 75 mm apart in the length direction. Each film sample was placed unrestrained for 10 min. in an oven that had been set at 149° C. Film shrinkage was measured upon removal in the DD direction. DD % shrinkage was 100 times the change in distance between the notches divided by the initial distance between the notches. The larger value was reported.

Porous Film Tensile Test

The tensile test was used to obtain stress-strain data for porous films. Porous film samples having a width of 2.54 cm were made with a special cutter comprised of paired, accurately gapped razor blades. The samples were tested using a SINTECH™ Model 20 (available from MTS Systems Corp., Eden Prairie, Minn.). The raw data was analyzed using TESTWORKS FOR WINDOWS™ version 3.06 software package (from MTS Systems Corp.). The thickness of each sample was measured and input to the TESTWORKS FOR WINDOWS™ program so that tensile results could be displayed based on sample cross-sectional area. A 22.7 kg (50-lb.) load cell was used in these tests. All samples were tested at a crosshead speed of 12.7 cm/min (5 in/min). Samples were tested along the down-web direction (DD), as well as the cross-web direction (CD).

Gurley Airflow Test

This value was a measurement of time in seconds required to pass 50 cubic centimeters (cc) of air through a film according to ASTM D-726 Method B. A value of greater than 10,000 seconds (sec.)/50 cc was assigned if no airflow was observed for 100 sec. from the start of the test.

Materials Used

| Material | Description |
| --- | --- |
| PSA A | Made substantially as taught in U.S. Pat. No. 5,804,610 (incorporated herein by reference) with materials of (1) an acrylate monomer, iso-octyl acrylate (IOA) as 98 weight percent of the monomer component, (2) a polar monomer, acrylic acid (AA) as 2 weight percent of the monomer component, (3) a photoinitiator, IRGACURE ™ 651 (2,2-Dimethoxy-2-phenylacetophenone, available from Ciba Specialty Chemicals, Basel, Switzerland), in the amount of 0.15 weight percent per 100 parts of the monomer component, and (4) a chain transfer agent, isooctylthioglycolate (IOTG, available from Atofina Fine Chemicals, Mourencx, France), in the amount of 0.02 weight percent per 100 parts of the monomer component. The pouches weighed 0.8 g each, contained 20 g of material and were made of 25 $\mu$m thick ethylene vinyl acetate (EVA) obtainable as VA-24 from Huntsman Packaging Corp., Performance Films Division, Chippewa Falls, Wisconsin. The polymerization was by exposure to 17.125 W/cm$^2$ of ultraviolet (UV) radiation from medium pressure mercury lamps. |
| PSA B | Made as PSA A except IOA/AA was 94/6 and IOTG was present at 0.02 weight percent per 100 parts monomer component. |
| PSA C | Made as PSA A except monomer component was made of 2-ethylhexyl acrylate (2-EHA), butyl acrylate (BA), VEOVA ™ 9 (vinyl ester of VERSATIC ™ 9, a synthetic saturated monocarboxylic acid of a highly branched tertiary structure containing eleven carbon atoms, $T_g$ of a homopolymer of VEOVA ™ 9 = 70° C., available from Resolution Performance Products, AN Hoogvliet Rt, The Netherlands.) and AA in a ratio in parts by weight of 45/30/25/5. This PSA was made according to an earlier filed European Patent Application having number 01204789, and having attorney's docket number 57380EP002. Also, the photoinitiator was IRGACURE ™ 184 (1-Hydroxy-cyclohexyl-phenyl-ketone available from Ciba Specialty Chemicals) at 0.2 weight percent per 100 parts of the monomer component and no IOTG was present. |
| SHELLFLEX ™ 371 | A naphthenic oil having 10% aromatics available from Shell Chemical Co., Houston, Texas. |
| ELVAX ™ 260 | An ethylene vinyl-acetate copolymer (EVA), available from Dupont Packaging and Industrial Polymers, Wilmington, Delaware, having a melt flow index of 6 dg/min (ASTM D 1238) and a vinyl acetate content of 28-% by weight |
| ELVAX ™ 350 | An ethylene vinyl-acetate copolymer (EVA), available from Dupont Packaging and Industrial Polymers, Wilmington, Delaware, having a melt flow index of 19 dg/min (ASTM D 1238) and a vinyl acetate content of 28-% by weight |
| Compatibilizer A | Aminated polyethylene with 0.9 wt % amination was made by melt mixing maleic anhydride-functionalized polyethylene (FUSABOND ™ MB-226D, available from DuPont, Dupont Packaging and Industrial Polymers) with 3-dimethylaminopropyl amine (obtained from Aldrich Chemical Co., Milwaukee, Wisconsin) at 350° C. for 10 minutes in a twin screw extruder. |
| EMS Foam Agent | Micropearl F-100D thermoexpandable microcapsule, copolymer of acrylonitrile and acrylic, Lehmann & Voss Co. Hamburg, Germany. |
| REXFLEX ™ W101 | Significantly atactic polypropylene available from Huntsman Polypropylene Corp., Woodbury, New Jersey. |
| FINA ™ 3374 | Isotactic polypropylene available from Fina Oil & Chem., Dallas, Texas. |

-continued

Materials Used

| Material | Description |
|---|---|
| TOPAS ™ 6017 | A cyclic polyolefin, copolymer of norbornene and ethylene, Tg of 180° C. (356° F.), available from Ticona GmbH, Frankfurt, Germany. |
| DS-5D45 | Polypropylene homopolymer, available from Union Carbide, Somerset, New Jersey. |
| PP1024 | Polypropylene homopolymer, available from Exxon Mobil Chemical, Houston, Texas. |
| REMAFIN ™ Blue APY 5014A | Blue color concentrate, available from Clariant, Charlotte, North Carolina. |
| SUPERLA ™ White Mineral Oil #31 | A white mineral oil available from Chevron Texaco Corporation, San Francisco, California. |
| MILLAD ™ 3905 | Nucleating additive, dibenzylidene sorbital available from Milliken Chemical, Spartanburg, South Carolina. |
| MILLAD ™ 3988 | Nucleating additive, 3,4-dimethylbenzylidene sorbital, available from Milliken Chemical. |
| ENGAGE ™ 8200 | An ethylene/poly-α-olefin copolymer available from Dupont-Dow Elastomers, Wilmington, Delaware. |

Examples 1–4 and Comparative Examples 1–2

This illustrates the effect of multiple layers having a plurality of distinct phases on properties of various PSAs.

In Example 1, PSA A was fed by a single screw extruder (50-mm BONNO™ 2WPKR with 4 zones, available from Bonnot Manufacturing, Uniontown, Ohio) operating with zone temperatures increasing from 165° C. to 177° C., into a co-rotating twin screw extruder (25 mm Werner and Pfleiderer, Model ZSK-25, 10 barrels, length:diameter (L/D) of 40:1, available from Werner and Pfleiderer, Ramsey, N.J.) and then into the five continuous first chambers of a nine-layer die, (described in co-pending, and concurrently filed, U.S. patent application Ser. No. 10/028052. A premixed 97/3 weight ratio blend of thermoplastic, ENGAGE™ 8200, and blue pigment, REMAFIN™ Blue APY 5014A, was fed by a single screw extruder (KILLION™ Model KLB-075, 19 mm, having 4 zones, and an L/D of 32:1, available from Killion Extruder Inc., Cedar Grove, N.J.) operating with zone temperatures increasing from 182° C. to 243° C., into the four discontinuous second chambers of the die. Each second chamber had rows of circular openings having a diameter of about 76 µm (30 mils) and a center-to-center spacing of about 3.8 mm (150 mils). The rows of holes were staggered such that rows one and three had 67 holes and rows two and four had 66 holes. The continuous and discontinuous streams were merged in the die, the flow stream passed through the exit of the 25 cm (10 in.) wide orifice to form a PSA composite containing four discontinuous layers and five continuous layers. The composite was drop cast onto the silicone side of a silicone coated paper release liner, sandwiched by the silicone surface of another liner, and passed over a chill roll. The temperatures of die and chill roll were set at 204° C. and 10° C., respectively, and the line speed was about 21 meters per minute (m/min.). The PSA composite had an overall measured thickness of 60 µm and a calculated material weight ratio of continuous to discontinuous material of 90.5 to 9.5.

Example 2 was made as in Example 1 except the composition of the material in the second chambers was different. The second chamber material was a 50:50 wt percent pre-mixture of Compatibilizer A and ENGAGE™ 8200 with blue pigment added to form a Engage 8200/Compatibilizer A/blue pigment weight ratio of 48.5/48.5/5.3. The PSA composite had an overall measured thickness of 60 µm and a calculated material weight ratio of continuous to discontinuous material of 90.5 to 9.5.

Example 3 was made in the same manner as Example 2, except the overall content of the second chamber material was decreased by 50%. The PSA composite had an overall measured thickness of 60 µm and a calculated material weight ratio of continuous to discontinuous material of 95 to 5.

Example 4 was made as Example 3 except PSA B was used in place of PSA A.

Comparative Example 1 and 2 were made substantially as in Example 1 and 4 except that no second chamber material was used.

All examples were tested for peel strength against SS after 20 minutes conditioning, room temperature shear holding against SS, peel strength against PCC after 24 hour conditioning. Results are reported in Table 1.

TABLE 1

| Ex. | Cont. | Discontinuous | Ratio by wt. | Thick µm | Peel to SS N/dm | RT Shear to SS min. | Peel to PCC N/dm | Peel to PCC N/dm |
|---|---|---|---|---|---|---|---|---|
| 1 | PSA A | ENGAGE ™ 8200 | 90.5/9.5 | 60 | 50 | 6013 | — | — |
| 2 | PSA A | ENGAGE ™ 8200/Comp. | 90.5/9.5 | 60 | 53 | 5223 | 72 | 85 |
| 3 | PSA A | ENGAGE ™ 8200/Comp. | 95/5 | 60 | 69 | 10,000+ | 63 | 60[1] |

TABLE 1-continued

| Ex. | Cont. | Discontinuous | Ratio by wt. | Thick μm | Peel to SS N/dm | RT Shear to SS min. | Peel to PCC N/dm | Peel to PCC N/dm |
|---|---|---|---|---|---|---|---|---|
| CE1 | PSA A | none | 100/0 | 60 | 48 | 72 | 47 | 43 |
| 4 | PSA B | ENGAGE ™ 8200/Comp. | 95/5 | 60 | 66 | 10,000+ | — | — |
| CE2 | PSA B | none | 100/0 | 60 | 56 | 147 | — | — |

[1]Cohesive film

As seen, room temperature shear time for samples of the invention was substantially increased over samples that did not contain multiple layers of discontinuous regions of polymer and peel strength to both SS and PCC also increased.

Examples 1–3 and Comparative Examples 1 and 2 were further crosslinked with electron-beam irradiation. Samples were exposed to 60 kGy (6 MRads) with an electron source, EBV™ 2502-0300, available from Polymer Physik of Tuebingen, Germany and operating at 175 kV. These examples were then tested for peel strength against PCC and room temperature shear holding against PCC. Results are reported in Table 2.

TABLE 2

| Ex | Cont. | Dis-continuous | Ratio by wt. | Thickness μm | Peel to PCC N/dm | RT Shear to PCC min. |
|---|---|---|---|---|---|---|
| 1 | PSA A | ENGAGE ™ 8200 | 90.5/9.5 | 60 | — | 10,000+ |
| 2 | PSA A | ENGAGE ™ 8200/Comp. | 90.5/9.5 | 60 | 43 | 10,000+ |
| 3 | PSA A | ENGAGE ™ 8200/Comp. | 95/5 | 60 | 50 | 10,000+ |
| CE1 | PSA A | none | 100/0 | 60 | 18 | 6736 |

As seen, room temperature holding time for samples of the invention was substantially increased over samples that did not contain multiple layers of discontinuous regions of polymer, and peel strength to powder clear coat did not decrease nearly as much as the sample without multiple discontinuous regions.

Examples 5–7, Comparative Example 3

Examples 5–7 illustrate the effect of using a low surface energy pressure sensitive adhesive combined with multiple discontinuous layers.

Example 5 was made in a similar manner to Example 1 except some materials and process conditions were changed. The continuous material was PSA C and the discontinuous material was ELVAX™ 260. PSA C was heated to 166° C. and ELVAX™ 260 was heated to 193° C. The temperatures of the die and chill roll were set at 204 and 70° C., respectively, and the line speed was about 20 meters per minute (m/min.). The PSA composite had an overall measured thickness of 50 μm and a calculated material weight ratio of continuous PSA C to discontinuous ELVAX™ 260 of 97.5:2.5. Samples were crosslinked by e-beam irradiation with conditions set at 195 kilovolts (kV) and 60 kilograys (kGy) (6 Megarads (Mrad)).

Example 6 and 7 were made as in Example 5 except the calculated material weight ratio of PSA C to ELVAX™ 260 was 95.0:5.0 and 89.9:10.1, respectively.

Comparative Example 3 was made substantially as in Example 5 except that no material was extruded into the second set of chambers of the die.

Examples were tested for peel adhesion to PCC after 20 min. conditioning, peel adhesion to polypropylene (PP) after 20 min. conditioning, and high temperature shear holding to PCC with 1000 g (PCC-1) and 2000 g (PCC-2) weights. The results are shown in Table 3.

TABLE 3

| Ex | Cont. | Dis-continuous | Ratio by wt. | Thick μm | Peel to PCC N/dm | Peel to PP N/dm | HT Shear to PCC-1 min. | HT Shear To PCC-2 min. |
|---|---|---|---|---|---|---|---|---|
| 5 | PSA C | ELVAX ™ | 97.5/2.5 | 50 | 46 | 35 | 10,000+ | 20,000+ |
| 6 | PSA C | ELVAX ™ | 95.0/5.0 | 50 | 46 | 34 | 10,000+ | 20,000+ |
| 7 | PSA C | ELVAX ™ | 89.1/10.1 | 50 | 46 | 32 | 10,000+ | 20,000+ |
| CE3 | PSA C | none | 100/0 | 50 | 46 | 30[1] | 10,000+ | Under 100 |

[1]tape exhibited a repeated stick-release performance during peel test.

As seen above, high temperature shear holding is increased for constructions of the invention as compared with similar constructions with discontinuous layers.

Examples 8–10 and Comparative Example 4

Examples 8–10 illustrate the effect of using a foamed pressure sensitive adhesive combined with multiple discontinuous layers.

Example 8 was made in a similar manner to Example 1 except some materials and process conditions were changed. The material used for the continuous layers was PSA C and a foaming agent, EMS Foam Agent, and the material for the discontinuous layers was ELVAX™ 350. The foaming agent was added at 2.5% wt percent per 100 wt percent PSA C into the 8$^{th}$ barrel port of the twin screw extruder. The mixture of PSA C and foaming agent was heated to 104° C. and ELVAX™ 350 was heated to 193° C. The temperatures of die and chill roll were set at 177° C. and 38° C., respectively, and the line speed was about 1.5 m/min. The PSA composite had an overall measured thickness of 900 μm, a density of 0.57 g/cc and a calculated material weight ratio of continuous PSA C to discontinuous ELVAX™ 350 of 97.5/2.5. Samples were crosslinked by e-beam irradiation with conditions set at 250 kV and 60 kGy (6 MRad).

Examples 9 and 10 were made as in Example 8, except the calculated material weight ratio of continuous material to discontinuous material was 95/5 and 90/10, respectively and the foam density was as shown in Table 4.

Comparative Example 4 was made substantially as in Example 7 except that no material was extruded into the second chambers of the die.

All examples were tested for Thickness, Density and Tensile Properties of Elastic Modulus, Maximum Force and Elongation. The results are shown in Table 4.

overall measured thickness of 75 μm and a calculated material weight ratio of continuous polymer to discontinuous polymer of 95.0:5.0. The sample was annealed for 10 minutes at 149° C. prior to testing.

Example 12 was made as in Example 11, except the calculated material weight ratio of continuous polymer to discontinuous polymer was 90.0:10.0.

Comparative Example 5 was made substantially as in Example 11 except that no discontinuous material was present.

Samples were tested for tensile properties of modulus and elongation at break, stress relaxation, necking and shrinkage. The results are shown in Table 5.

TABLE 4

| Ex | Cont. | Discontinuous | Ratio by wt. | Thick μm | Density g/cc | E-Modulus MPa | Max Force MPa | Elong % |
|---|---|---|---|---|---|---|---|---|
| 8 | PSA C | ELVAX ™ | 97.5/2.5 | 887 | 0.57 | 2.36 | 0.90 | >1400 |
| 9 | PSA C | ELVAX ™ | 95/5 | 540 | 0.94 | 1.98 | 1.28 | 710 |
| 10 | PSA C | ELVAX ™ | 90/10 | 985 | 0.59 | 3.70 | 1.00 | 540 |
| CE4 | PSA C | none | 100/0 | 908 | 0.56 | 1.18 | 0.21 | >1400 |

As seen in the above table, foams of the invention with an equivalent density and elongation to that of foams without

TABLE 5

| Ex | Cont. | Discont. | Ratio by wt. | Modulus MPa(kpsi) | Elong % | Stress Rel % | Necking % | Shrink % |
|---|---|---|---|---|---|---|---|---|
| 11 | REXENE ™/FINA ™ | TOPAS ™/FINA ™ | 95/5 | 257 (37.3) | 333 | 49.3 | 0 | 0 |
| 12 | REXENE ™/FINA ™ | TOPAS ™/FINA ™ | 90/10 | 255 (37) | 10 | 50.8 | 0 | 0 |
| CE5 | REXENE ™/FINA ™ | none | 100/0 | 177 (25.6) | 596 | 51.1 | 0 | 28 | fibrous layers were stronger. Also foams of the invention could be made to have a different elongation.

Examples 11–12 and Comparative Example 5

Examples 11–12 illustrate effect on a conformable polypropylene film of a multitude of discontinuous polymeric regions.

Example 11 was made in a similar manner to Example 1 except some materials and process conditions were changed. The continuous material was a premixed blend of 60 wt % REXENE™ W101 and 40 wt % FINA™ 3374, and the discontinuous material was a premixed blend of 90 wt % TOPAS™ 6017 and 10 wt % FINA™ 3374. Continuous material was heated to 232° C. and discontinuous material was heated to 299° C. The temperatures of die and chill roll were set at 266° C. and 110° C., respectively, and the line speed was about 20 m/min. The film composite had an As seen in the above table, a small amount of discontinuous material improves dimensional stability while maintaining conformability.

Example 13

This example illustrates a decorative membrane.

A continuous material composed of polymer, DS-5D45, and nucleating agent, MILLAD™ 3905, was fed at parts by wt of 54.8 and 0.2, respectively. The continuous material was fed into the feed throat of a co-rotating twin screw extruder (40 mm Berstorff, model ZE40 with 8 barrels, each with an L/D of 5:1, available from Berstorff Corporation, Florence, Ky.). Diluent, SUPERLA™ White Mineral Oil #31 (Oil) was then added at 45 parts by wt. into extruder barrel 3 to form a first melt solution. The first melt solution was then passed into the first chambers of the multi-manifold die of Example 1 to form continuous layers of polymer. A mixture of DS-5D45 and REMAFIN™ Blue APY 5014A at parts by wt of 60 and 5, respectively, was fed into the throat of a second extruder. The second extruder was a co-rotating twin screw extruder (25 mm Berstorff, model ZE25 with 6 barrels, each with an L/D of 5:1, available from Berstorff Corporation, Florence, Ky.). More diluent, oil, was fed at 35 parts by wt into extruder barrel 2 of the second extruder to form a second melt solution. The second melt solution was then passed into the second chamber of the die to form layers of discontinuous polymer regions. The continuous and discontinuous layers were merged in the die and the multi-layer composite flow stream passed through the exit of the 25 cm (10 in.) wide orifice and was drop cast onto a chill roll to form a composite having multiple layers of discontinuous material. The temperatures of die and chill roll were set at 215° C. and 65° C., respectively, and the line speed was about 10 m/min. The composite film had an overall measured thickness of 190 µm. The composite film was then fed into a length orienter followed by a width orienter to be stretched to about 1.7:1 in the down-web direction and 2.0:1 in the cross-web direction to create a porous membrane. The membrane was visually appealing film with blue stripes in a white background. When used to wipe oil from a person's face, the blue stripes became darker in appearance, which is a visual indication of successful oil removal.

Example 14 and Comparative Example 6

This illustrates the effect of a multitude of discontinuous polymeric regions on overall strength properties of a porous membrane.

Example 14 was made in a manner similar to Example 13 except the materials and some process conditions were changed. The continuous material was composed of DS-5D45, MILLAD™ 3988, and Oil in parts by wt of 64.9, 0.1 and 35, respectively. Discontinuous material was composed of only polymer, PP1024. The temperature of die was set at 246° C. and the line speed was about 5 m/min. The composite film was stretched to about 1.7:1 in the down-web direction and 2.0:1 in the cross-web direction to form a porous membrane with a multitude of non-porous polymer discontinuous regions that were substantially continuous in the down-web direction.

Comparative Example 6 was made the same way as example 14, except no material was passed through the second chamber.

Samples were tested for porous film tensile properties of down-web direction (DD) modulus and cross-web direction (CD) modulus, and Gurley Air Flow. Results are shown in Table 6.

TABLE 6

| Ex. | Cont. | Discont. | Ratio by wt. | Thick µm | DD Modulus MPa | DD Modulus MPa | Gurley sec |
|---|---|---|---|---|---|---|---|
| 14 | DS5D45/MILLAD ™/Oil | PP1024 | 93/7 | 137 | 473 | 903 | 81 |
| CE6 | DS5D45/MILLAD ™/Oil | none | 100/0 | 130 | 363 | 715 | 110 |

As seen in the above table, presence of a multitude of discontinuous polymeric regions increased the modulus about 30% in both down-web and cross-web directions, while retaining good porosity as evidenced by similar Gurley airflow values.

What is claimed is:

1. A polymeric coextruded multilayer web, the web comprising:

at least two layers that are discontinuous in the cross-web direction comprising a plurality of distinct phases that are substantially continuous in the down-web direction; and at least three layers that are substantially continuous in both the cross-web and down-web directions, at least one of the continuous layers comprising a pressure sensitive adhesive;

wherein said layers of phases are embedded between continuous layers and are separated from each other by continuous layer material of said multilayer web.

2. The web of claim 1 wherein the materials comprising said substantially continuous layers and said discontinuous layers are polymers having polymer melt viscosities within a factor of two of one another.

3. The web of claim 1 wherein said discontinuous layers independently comprise a material selected from the group consisting of thermoplastic materials, elastomeric materials, high viscosity liquids, and mixtures thereof.

4. The web of claim 1 wherein said continuous layers comprise an acrylic pressure-sensitive adhesive and wherein said discontinuous layers independently comprise a material selected from the group consisting of a non-pressure-sensitive adhesive, a thermoplastic polyolefin, and combinations thereof.

5. The web of claim 4 wherein said thermoplastic polyolefin is selected from the group consisting of ethylene vinyl acetate copolymers, ethylene/poly-α-olefin copolymers, amino-compatibilized polyolefins and blends of ethylene/poly-α-olefin and amino-compatibilized polyolefin polymers.

6. The web of claim 4 wherein said discontinuous layers comprise homopolymers or copolymers selected from the group consisting of ethylene vinyl-acetate copolymers, isotactic polypropylene, copolymers of norbornene and ethylene and ethylene/poly-α-olefrn copolymers.

7. The polymeric web of claim 1 wherein the substantially continuous layers comprise pressure sensitive adhesive polymer that is foamed.

8. The web of claim 1 wherein said substantially continuous layers comprise a material selected from blends of polyolefins and elastomeric block copolymers, natural or synthetic rubbers and blends of isotactic polypropylene and elastomeric polypropylene and wherein said discontinuous layers comprise a material selected from the group consisting of cyclic polyolefins and blends of cyclic polyolefin with non-cyclic polyolefin.

9. The web of claim 1 wherein said discontinuous layers alternate with said continuous layers.

10. The web of claim 1 wherein said web has two substantially continuous layers between each discontinuous layer.

* * * * *

UNITED STATES PATENT AND TRADEMARK OFFICE
CERTIFICATE OF CORRECTION

PATENT NO. : 6,949,283 B2
DATED : September 27, 2005
INVENTOR(S) : Kollaja, Richard A.

It is certified that error appears in the above-identified patent and that said Letters Patent is hereby corrected as shown below:

Column 2,
Line 1, after "09/325,963" delete ",".
Line 9, after "Wagner" delete "hans" and insert -- Hans --.

Column 4,
Line 45, before "rubber." delete "styrenelbutadiene" and insert -- styrene/butadiene --.

Column 8,
Line 52, before "PSAs." delete "polyαolefin" and insert -- poly-α-olefin --.

Column 10,
Line 23, after "Co-pending" insert -- , --.

Column 12,
Line 9, after "paired," delete "acurately" and insert -- accurately --.
Line 9, after "razor" delete "baldes." and insert -- blades. --.
Line 11, before "available" delete "commerically" and insert -- commercially --.

Column 19,
Line 66, before "respectively" delete "110° C." and insert -- 10° C. --.

Column 22,
Line 37, after "of" delete "norbomene" and insert -- norbornene --.
Line 38, after "ethylene/" delete "poly-α-olefrn" and insert -- poly-α-olefin --.

Signed and Sealed this

Twenty-fifth Day of April, 2006

JON W. DUDAS
*Director of the United States Patent and Trademark Office*